(12) United States Patent
Chen

(10) Patent No.: US 12,306,051 B2
(45) Date of Patent: May 20, 2025

(54) BICYCLE PEDAL SIGNAL DETECTION DEVICE

(71) Applicant: Yu-Yu Chen, Taipei (TW)

(72) Inventor: Yu-Yu Chen, Taipei (TW)

( * ) Notice: Subject to any disclaimer, the term of this patent is extended or adjusted under 35 U.S.C. 154(b) by 278 days.

(21) Appl. No.: 17/974,644

(22) Filed: Oct. 27, 2022

(65) Prior Publication Data
US 2023/0134323 A1 May 4, 2023

(30) Foreign Application Priority Data

Nov. 4, 2021 (TW) ................. 110213026

(51) Int. Cl.
| | | |
|---|---|---|
| *G01L 1/22* | (2006.01) | |
| *B62J 43/30* | (2020.01) | |
| *B62J 45/41* | (2020.01) | |
| *G01L 5/00* | (2006.01) | |

(52) U.S. Cl.
CPC ............. *G01L 1/22* (2013.01); *B62J 43/30* (2020.02); *B62J 45/41* (2020.02); *G01L 5/00* (2013.01)

(58) Field of Classification Search
CPC .................... G01L 5/225; G01B 5/30
See application file for complete search history.

(56) References Cited

U.S. PATENT DOCUMENTS

| | | | | |
|---|---|---|---|---|
| 6,517,357 B1* | 2/2003 | Athanasiou | ............ | H01R 39/64 |
| | | | | 439/26 |
| 6,874,387 B2* | 4/2005 | Vaughn | ............ | B62K 15/00 |
| | | | | 403/325 |
| 7,993,164 B2* | 8/2011 | Chatterjee | ............ | H01R 39/64 |
| | | | | 439/651 |
| 8,011,242 B2* | 9/2011 | O'Neill | ............ | B62J 45/411 |
| | | | | 73/379.01 |
| 8,327,723 B2* | 12/2012 | Roudergues | ............ | B62J 45/41 |
| | | | | 73/862.51 |
| 8,844,404 B2* | 9/2014 | Chen | ............ | B62J 45/421 |
| | | | | 74/594.4 |
| 8,961,191 B2* | 2/2015 | Hanshew | ............ | B62M 3/16 |
| | | | | 439/21 |
| 9,097,598 B2* | 8/2015 | Grassi | ............ | B62M 3/003 |
| 9,127,969 B2* | 9/2015 | Kokkoneva | ............ | B62M 3/08 |
| 9,496,769 B2* | 11/2016 | Tetsuka | ............ | B62J 45/41 |
| 9,580,138 B2* | 2/2017 | Tetsuka | ............ | B62J 43/30 |

(Continued)

*Primary Examiner* — Tran M. Tran
(74) *Attorney, Agent, or Firm* — Ying-Ting Chen

(57) ABSTRACT

A signal detection device includes a strain gauge disposed in a strain gauge disposition section defined on a rotation spindle; a control circuit board disposed in the strain gauge disposition section and electrically connected to the strain gauge; an electrical power supply unit received in a receiving space defined in a pedal body to supply electrical power; an electric brush device disposed in a brush disposition section defined on the rotation spindle and set between the pedal body and the rotation spindle. The electric brush device is electrically connected to the control circuit board to supply the electrical power to the control circuit board. The electric brush device keeps the electrical power supply unit in electrical connection with the control circuit board whether the pedal body is rotating relative to the rotation spindle or not. Alternatively, the signal detection device adopts a structure of contact pin assembly and a removable battery assembly located between a free end of the rotation spindle and an end cap of the pedal body.

8 Claims, 14 Drawing Sheets

(56) References Cited

U.S. PATENT DOCUMENTS

| | | | | |
|---|---|---|---|---|
| 9,593,993 | B1* | 3/2017 | Chen | B62J 45/41 |
| 9,810,593 | B2* | 11/2017 | Carrasco Vergara | B62M 3/00 |
| 9,921,118 | B2* | 3/2018 | Lull | G01L 3/242 |
| 9,969,451 | B2* | 5/2018 | Sasaki | B62M 3/086 |
| 10,000,249 | B2* | 6/2018 | Sasaki | B62M 1/36 |
| 10,232,244 | B2* | 3/2019 | Shen | G01B 5/24 |
| 10,551,260 | B2* | 2/2020 | Chen | A63B 22/0046 |
| 10,745,080 | B1* | 8/2020 | Chen | B62M 3/086 |
| 10,780,942 | B1* | 9/2020 | Chen | B62M 3/08 |
| RE48,626 | E* | 7/2021 | Tetsuka | B62J 45/421 |
| 11,377,169 | B2* | 7/2022 | Wakeham | B60L 53/00 |
| 11,787,503 | B2* | 10/2023 | Nichols | B62M 3/003 |
| | | | | 280/281.1 |
| 12,029,439 | B2* | 7/2024 | Belagali | A61B 17/1613 |
| 2007/0137307 | A1* | 6/2007 | Gruben | A63B 22/0046 |
| | | | | 73/774 |
| 2012/0073402 | A1* | 3/2012 | Tseng | G05G 1/483 |
| | | | | 74/563 |
| 2014/0273543 | A1* | 9/2014 | Hanshew | G01L 3/108 |
| | | | | 439/18 |
| 2016/0052584 | A1* | 2/2016 | Sasaki | G01L 3/24 |
| | | | | 74/594.4 |
| 2023/0174185 | A1* | 6/2023 | Lin | B62M 3/08 |
| | | | | 73/862.338 |

* cited by examiner

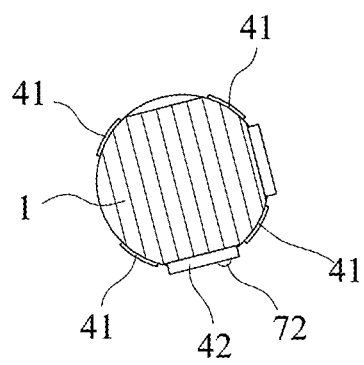
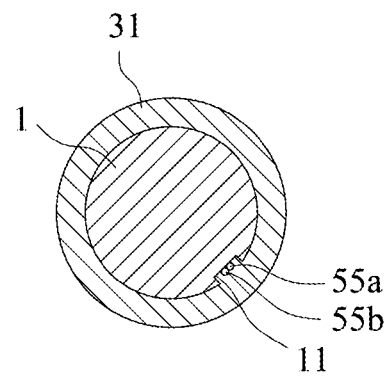
FIG.7    FIG.8
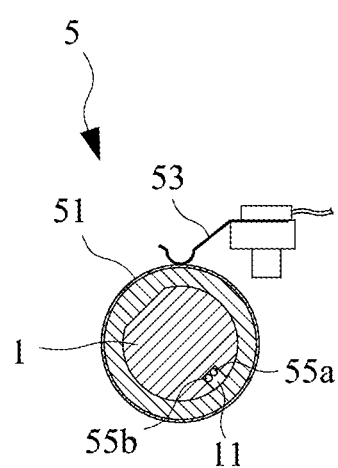
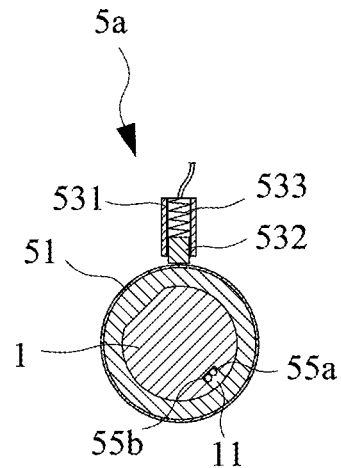
FIG.9    FIG.10

BICYCLE PEDAL SIGNAL DETECTION DEVICE

BACKGROUND OF THE INVENTION

1. Field of the Invention

The present invention relates to a bicycle signal measuring device, and more particularly to a pedaling signal detection device that measures the force and motion track of pedaling of a bicycle pedal to provide reference to a rider in doing exercise.

2. The Related Arts

Recently, cycling is loved by the modem people for doing exercise. However, although cycling is effective for providing an effect of exercise, the rider cannot accurately handle the exercise condition and the application of forces by the left and right feet in doing cycling.

Consequently, products of force detection units are available in the market. Such force detection units are operable to detect and analyze the strength of a force that the rider applies to a bicycle pedal and a distribution of force on the bicycle pedal, so that the rider may get aware of related information of exercise for improving his or her pedaling efficiency to achieve bettered exercise effect by the bicycle.

However, there is still room for improvement for the known products in respect of structure simplification, assembling easiness, durability, and charging convenience.

For example, a structure of a known bicycle pedal generally comprises two major parts, which are a pedal body (which is considered a "stator") and a rotation spindle (which is considered a "rotor"). A known pedal motion signal detection device is provided for measuring a pressing force signal on the rotation spindle, but a power supply device is arranged on the rotation spindle, one end of the rotation spindle, or extending to an outer end of a crank of the bicycle, making it suffering the following disadvantages:

(1) In the known pedal motion signal detection device, where the power supply device is arranged on the rotation spindle, since the rotation spindle is rotating for a full turn of 360 degrees, the battery so arranged on the rotation spindle has to take balance of the centrifugal force generated by the full-turn 360-degree rotation into consideration, and consequently, a cylindrical configuration or a cylindrical form of assembly must be adopted. The structure is thus complicated and the fabrication cost is high.

(2) In the known pedal motion signal detection device, where the power supply device is arranged above the rotation spindle, since a gap between the rotation spindle and the pedal body is limited, the capacity of the battery has to be excessively reduced, making it only operable for a very short period of time for each round of charging.

(3) In the known pedal motion signal detection device, where the power supply device is arranged above the rotation spindle, in addition to the gap between the rotation spindle and the pedal body being small to thereby limit the size of the battery and thus greatly reduce the capacity of the battery, an extra power connector must be provided for connection with an external power supply for charging, the structure being complicated and service being difficult.

(4) In the known pedal motion signal detection device, where the power supply device is arranged at an extended end of the rotation spindle by using an additional connector, the structure is complicated and is limited to the rotation spindle rotor, and the battery capacity is small.

(5) In the known pedal motion signal detection device, the pedaling signal detection device is arranged in a center of the rotation spindle and a hollow spindle is used, and this imposes constraints to the size and strength of the rotation spindle, and electrical power must be supplied through a power connection device arranged at one end of the spindle. The power supply structure is complicated, and the cost is high.

(6) In the known pedal motion signal detection device, the pedaling signal detection device is arranged in a center of the rotation spindle and a hollow spindle is used. The size of the battery is extremely limited due to being constrained by the gap between the rotation spindle and the pedal body, and the capacity of the battery is extremely small, making the life time of the battery extremely short.

(7) In the known pedal motion signal detection device, where the pedaling signal detection device is arranged above the rotation spindle, the supply of electrical power is made through a center of the rotation spindle, and a female part of a power connection device is provided at an open end of the center, and the battery and a specific connector (a male part) are provided to combine with and extend through the rotor and a center of a bicycle crank, making the structure complicated, the quality being hard to control, the cost high, and service difficult.

SUMMARY OF THE INVENTION

To resolve the problems of the known technology, the purpose of the present invention is to provide a novel pedal motion signal detection device, which provides reference information to a rider in doing exercise, so as to allow the rider to adjust exercise habits during exercise and enhance cycling efficiency.

To achieve the above objective, the present invention provides a bicycle pedaling signal detection device, which comprises at least one strain gauge, which is disposed in a strain gauge disposition section defined on the rotation spindle; a control circuit board, which is arranged in the strain gauge disposition section of the rotation spindle and is electrically connected to the at least one strain gauge; an electrical power supply unit, which is received in a receiving space defined in the pedal body to supply electrical power; and an electric brush device, which is disposed in a brush disposition section defined on the rotation spindle and is set at a position between the pedal body and the rotation spindle; wherein the electric brush device is electrically connected, by means of conductive wires, to the control circuit board to supply the electrical power of the electrical power supply unit to the control circuit board, and the electric brush device constantly keeps the electrical power supply unit in electrical connection, via the conductive wires, with the control circuit board both in a condition where the pedal body is rotating relative to the rotation spindle and a condition where the rotation spindle is kept stationary.

In the other embodiment of the present invention, a receiving space is defined between a free end of the rotation spindle and an end cap of the pedal body. The electric brush device comprises a slip ring carrying board, of which a surface that faces the free end of the rotation spindle is provided with an anode slip ring and a cathode slip ring that are spaced from each other and are each of a ring-like shape; and a brush carrying board, which is mounted to the free end of the rotation spindle, wherein a surface of the brush carrying board that faces the slip ring carrying board is provided with an anode brush and a cathode brush respectively corresponding to the anode slip ring and the cathode slip ring. The slip ring carrying board and a battery unit are arranged in and supported by a support seat, and the support seat is positioned in the receiving space between the free end of the rotation spindle and the end cap.

In another embodiment of the present invention, the electric brush device adopts a spring-biased electric brush device.

In a further embodiment of the present invention, the signal detection device adopts a structure of contact pin assembly and a removable battery assembly located between the free end of the rotation spindle and the end cap of the pedal body. The contact pin assembly is provided with an anode contact pin, a cathode contact pin and at least one signal contact pin, spaced from each other and located at the free end of the rotation spindle in the axial direction. The anode contact pin and the cathode contact pin are respectively connected by means of conductive wires to the control circuit board, and the at least one signal contact pin is connected by means of at least one signal transmission wire to the control circuit board. The removable battery assembly is provided with a battery container for accommodating a rechargeable battery unit therein and a contact point circuit board mounted to the battery container. The contact point circuit board is provided with an anode contact point and a cathode contact point connected to the rechargeable battery unit and at least one signal contact point connected to at least one electronic component mounted on the contact point circuit board. The anode contact point, the cathode contact point and the at least one signal contact point of the removable battery assembly are correspondingly contacted to the anode contact pin, the cathode contact pin and the at least one signal contact pin of the contact pin assembly, so that the electrical power of the rechargeable battery unit and at least one electronic signal of the at least one electronic component are supplied to the control circuit board through the removable battery assembly, the contact pin assembly and the conductive wires.

Preferably, the contact pin assembly further comprises a vertical supporting plate located at the free end of the rotation spindle for fixing the anode contact pin, the cathode contact pin and the at least one signal contact pin.

Preferably, the removable battery assembly further comprises a securing member for securing the contact point circuit board onto the battery container.

Preferably, the removable battery assembly further comprises an electricity charging port mounted on the contact point circuit board, so that an electrical power is charged through the electricity charging port to the rechargeable battery unit.

Preferably, the signal detection device further comprises an end bearing located between the battery container and the end cap.

Preferably, the signal detection device further comprises a first end circuit board arranged in the battery container.

Concerning efficacy, the present invention provides breaking concept and innovation, and in addition to improving the drawbacks of the known pedaling signal detection device, the principle of electric brush is applied to the pedal motion detection device to realize innovation of structure, high quality, easy assembly, low cost, extended battery life, easy servicing, and bettered green value for environmental protection.

BRIEF DESCRIPTION OF THE DRAWINGS

FIG. 7 is a cross-sectional view taken along line B-B of FIG. 6;

FIG. 8 is a cross-sectional view taken along line C-C of FIG. 6;

FIG. 9 is a cross-sectional view taken along line D-D of FIG. 6;

FIG. 10 is a cross-sectional view showing an electric brush device of another embodiment according to the present invention;

DETAILED DESCRIPTION OF THE PREFERRED EMBODIMENTS

Figure 1:
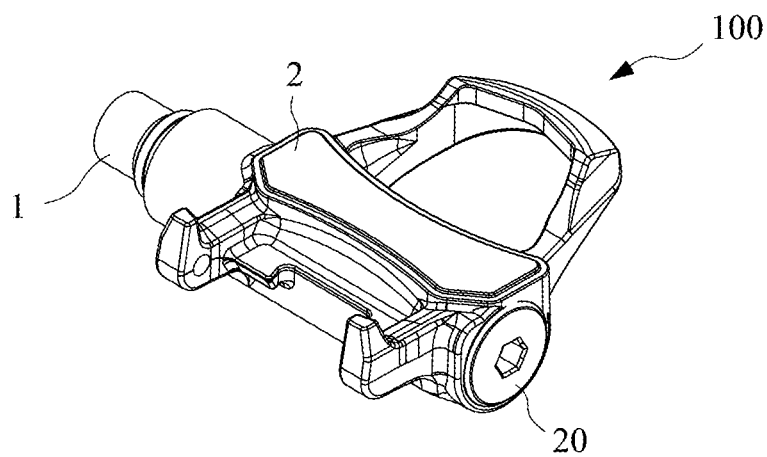
FIG. 1 is a perspective view showing a first embodiment according to the present invention.
Figure 2:
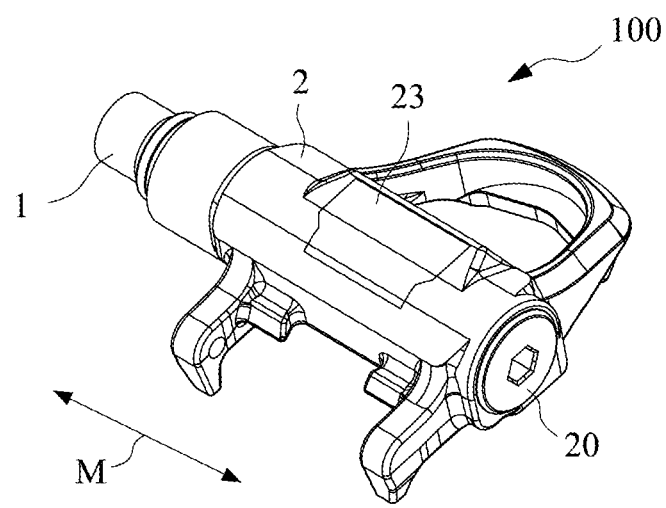
FIG. 2 is another perspective of the first embodiment according to the present invention.
Figure 3:
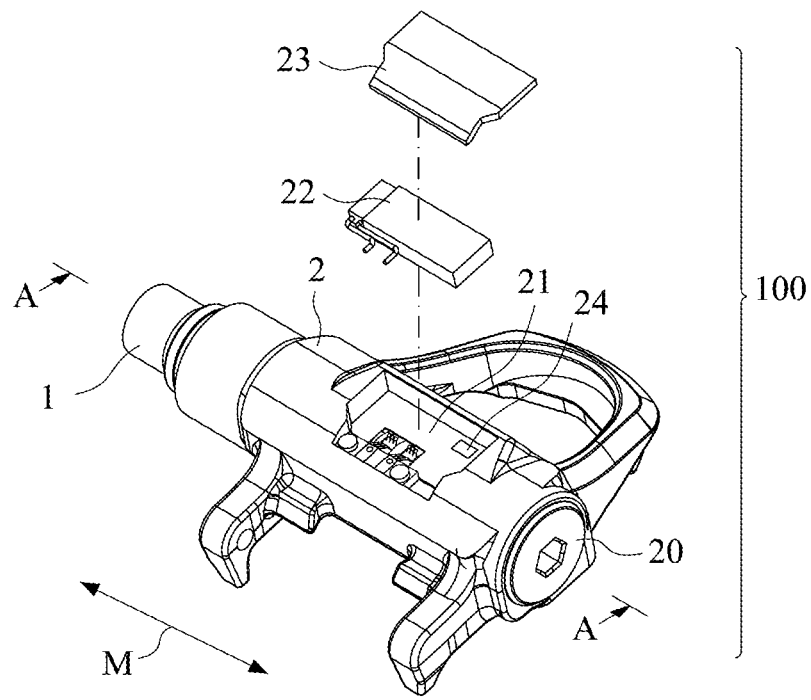
FIG. 3 is an exploded view of the first embodiment according to the present invention, with some part detached therefrom.
Figure 4:
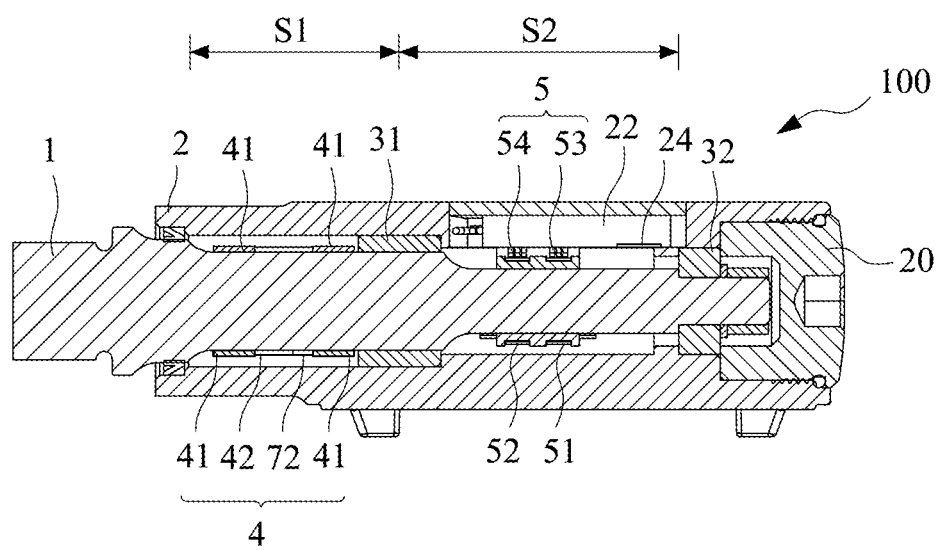
FIG. 4 is a cross-sectional view taken along line A-A of FIG. 3.

Referring to FIGS. 1-4, which shows a first embodiment according to the present invention, a bicycle pedal 100 generally comprises a rotation spindle 1 and a pedal body 2, wherein the rotation spindle 1 has a left end that is connectable to a bicycle pedal link (not shown) and a right end (which is an outer end) is a free end. The pedal body 2 is rotatably mounted, by means of a pair of known bearings 31, 32, to the rotation spindle 1, and an end cap 20 is mounted to an outer end of the pedal body 2. Since the pedal body 2 generally maintains at a horizontal position when pedaled by a rider, while the rotation spindle 1 is made rotating relative to the pedal body 2, the pedal body 2 will be referred to as a "stator" and the rotation spindle 1 will be referred to as a "rotor".

In the arrangement of the present invention, a signal detection device 4 is included to detect a pedaling signal generated by a pedaling operation of the bicycle pedal 100. The signal detection device 4 comprises at least one strain gauge 41 (four such strain gauges being shown in the drawings as an illustrative example for the embodiment), which is disposed in a strain gauge disposition section S1 defined by the rotation spindle 1. A control circuit board 42 is disposed in the strain gauge disposition section S1 and electrically connected to the at least one strain gauge 41.

A brush disposition section S2 is arranged adjacent to the strain gauge disposition section S1 in an axial direction M of the rotation spindle 1. In the instant embodiment, the first bearing 31 is located between the strain gauge disposition section S1 and the brush disposition section S2. In another embodiment of the present invention, the bearings 31 may be set at other positions on the rotation spindle 1 such that there is no bearing 31 between the strain gauge disposition section S1 and the brush disposition section S2.

The pedal body 2 is formed with a receiving space 21 at a location corresponding to the brush disposition section S2 to receive and hold at least one electrical power supply unit 22, and is closed and covered by a cover 23 set thereon. At least one electric brush device 5 is arranged in the brush disposition section S2 between the receiving space 21 of the pedal body 2 and the rotation spindle 1.

Figure 5:
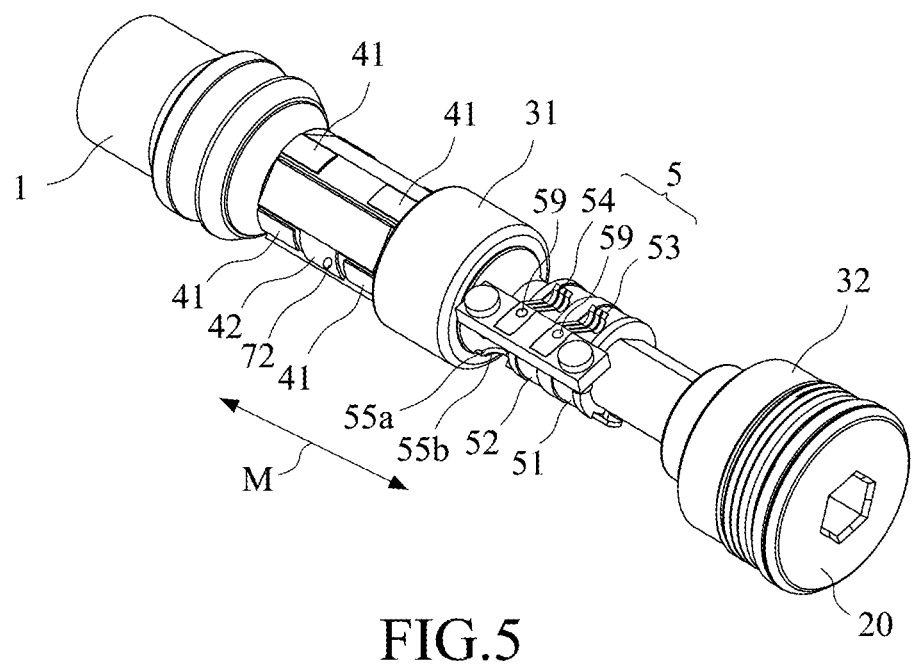
FIG. 5 is a perspective view illustrating spatial relationships among constituent components of the first embodiment according to the present invention.
Figure 6:
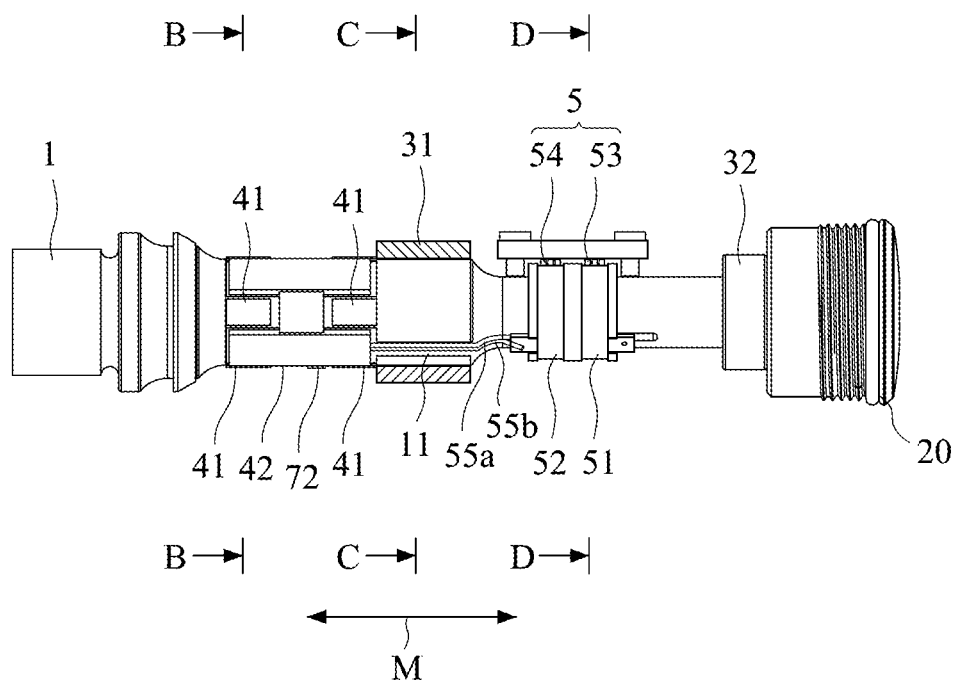
FIG. 6 is a side elevational view illustrating spatial relationships among the constituent components of the first embodiment according to the present invention.

Referring to both FIGS. 5 and 6, the electric brush device 5 comprises an anode slip ring 51 and a cathode slip ring 52, which are circumferentially arranged on the brush disposition section S2 of the rotation spindle 1 in a manner of being spaced from each other, and are respectively and electrically connected by an anode conductive wire 55a and a cathode conductive wire 55b to the control circuit board 42 located in the strain gauge disposition section S1. The conductive wires 55a, 55b can each be one of a metallic conductive wire and a flexible circuit board.

The electric brush device 5 further comprises an anode brush 53 and a cathode brush 54. The anode brush 53 and the cathode brush 54 each have a fixed end that is fixed by a positioning element 59 to be set in the receiving space 21 of the pedal body 2 and are electrically connected with the electrical power supply unit 22. The anode brush 53 and the cathode brush 54 each have an opposite end that is extended in a direction toward the brush disposition section S2 of the rotation spindle 1 to respectively contact the anode slip ring 51 and the cathode slip ring 52. The anode slip ring 51 and the cathode slip ring 52 are made of graphite, copper, or other metallic conductive materials.

The electrical power supply unit 22 has a positive electrode that is electrically connected through the anode brush 53, the anode slip ring 51, and the anode conductive wire 55a to the control circuit board 42, and the electrical power supply unit 22 has a negative electrode that is electrically connected through the cathode brush 54, the cathode slip ring 52, and the cathode conductive wire 55b to the control circuit board 42. As such, regardless whether the pedal body 2 is rotating relative to the rotation spindle 1 or is kept stationary relative to the rotation spindle 1, the electric brush device 5 constantly maintains the electrical power supply unit 22 in electrical connection with the control circuit board 42 to keep supplying electrical power to the control circuit board 42. In addition to the conductive wires 55a, 55b connecting the control circuit board 42 and the electrical power supply unit 22, at least one signal wire is electrically connected between the control circuit board 42 and the electrical power supply unit 22 to transmit, when necessary, at least one signal between the control circuit board 42 and the electrical power supply unit 22.

The electric brush device 5 comprises at least one or multiple electric brushes and slip rings that correspond to each other, and at least one circuit component 24 (such as a circuit board, an indicator, and so on) is arranged in the brush disposition section S2, so that the control circuit board 42 may be electrically connected, by means of at least one signal wire extending through the bearing 31 and the electric brush device 5, to the circuit component 24.

FIG. 7 is a cross-sectional view taken along line B-B of FIG. 6, showing, in the strain gauge disposition section St of the rotation spindle 1, strain gauges 41 are arranged on a circumferential surface of the rotation spindle 1 in a manner of being spaced from each other, and the control circuit board 42 is also disposed in the strain gauge disposition section S1.

FIG. 8 is a cross-sectional view taken along line C-C of FIG. 6, showing the rotation spindle 1 is formed, in an outer circumferential surface thereof that corresponds to the bearing 31, with a groove 11 that extends in the axial direction M of the rotation spindle 1 to allow the conductive wires 55a, 55b to extend therethrough.

FIG. 9 is a cross-sectional view taken along line D-D of FIG. 6, showing the anode brush and the cathode brush of the electric brush device 5 are each a reed-based electric brush device. Namely, as shown in the drawing, one end of the anode brush 53 is extended to contact the corresponding anode slip ring 51. In an actual application, a spring-biased electric brush device can be used. For example, FIG. 10 shows a spring-biased electric brush device 5a. Taking the anode or positive electrode as an example, a conductive member 531 is arranged at a location corresponding to the anode slip ring 51, and a carbon brush 532 and a spring 533 are loaded in the conductive member 531, so that the spring 533 pushes the carbon brush 532 to contact the anode slip ring 51 thereby realizing electrical connection, this also achieving a similar function.

Figure 11:
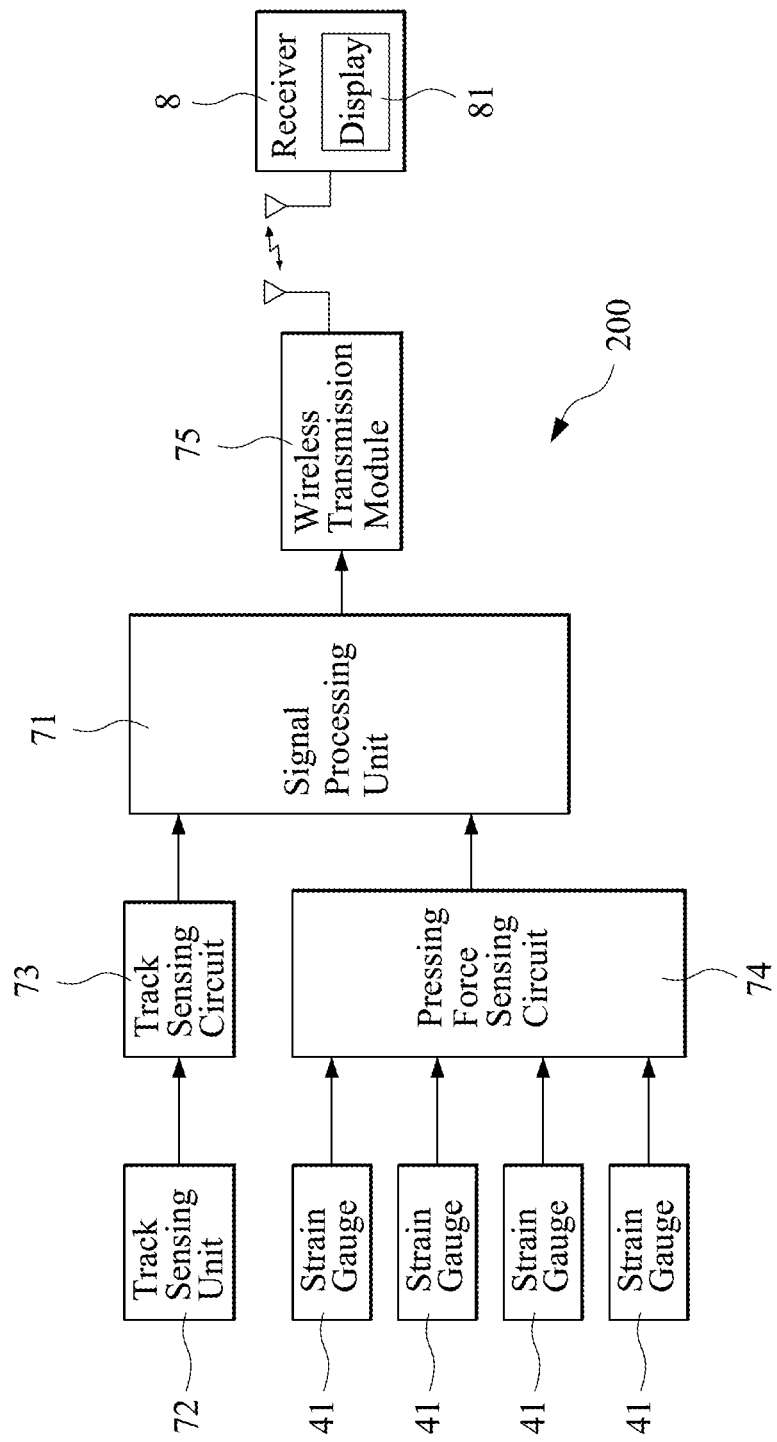
FIG. 11 is a circuit diagram of a control circuit according to the present invention.
Figure 12:
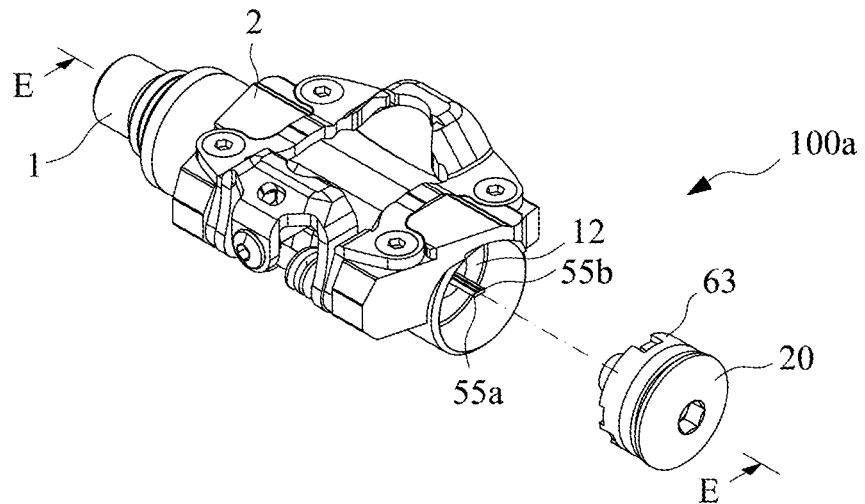
FIG. 12 is a perspective view showing a second embodiment according to the present invention.
Figure 13:
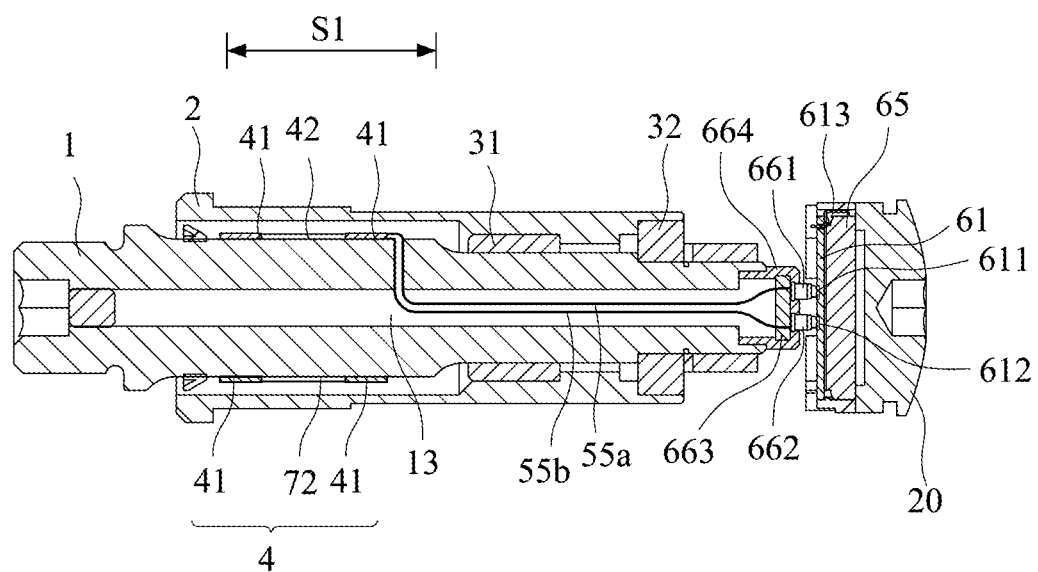
FIG. 13 is a cross-sectional view taken along line E-E of FIG. 12.
Figure 14:
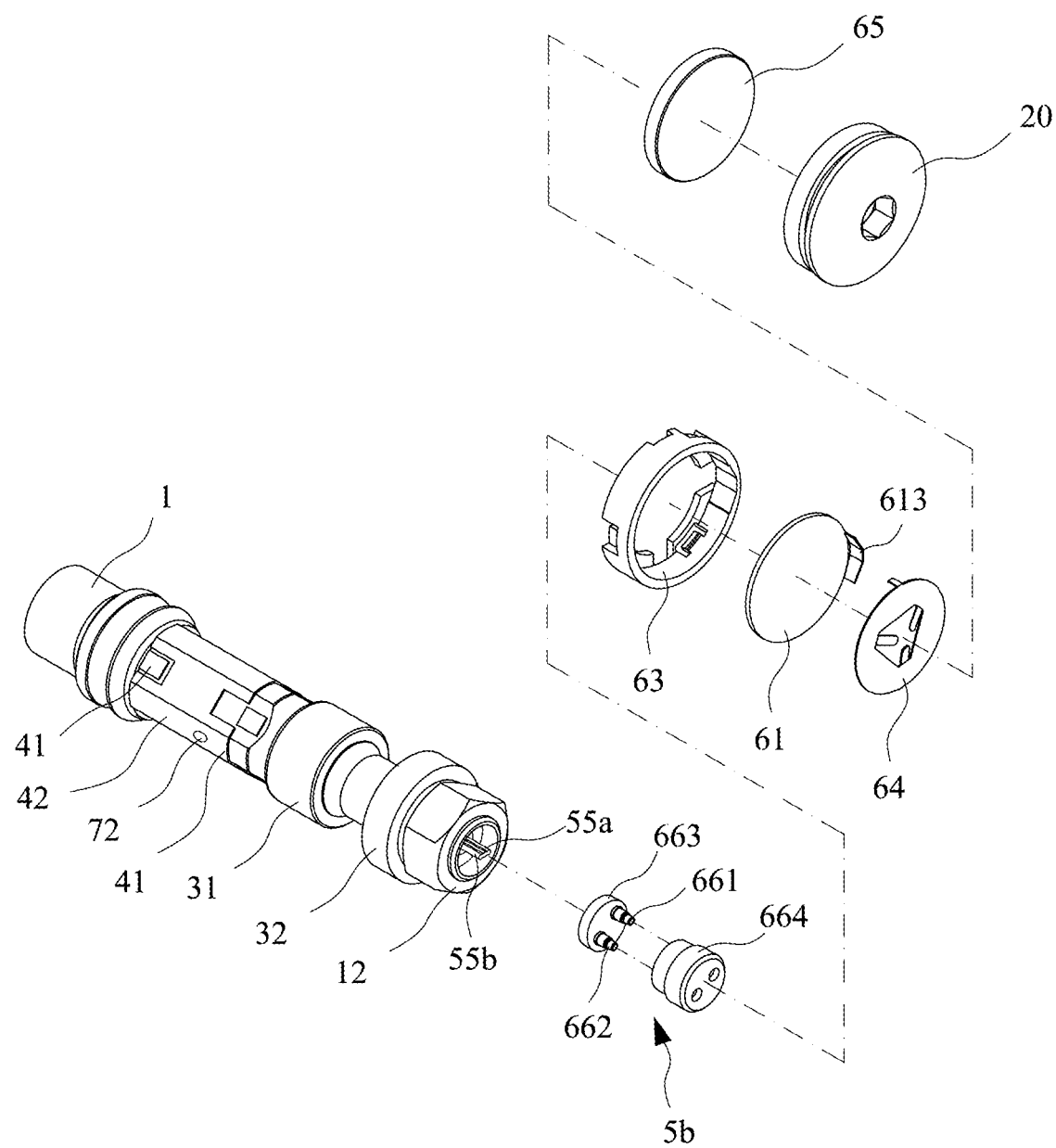
FIG. 14 is an exploded view of the second embodiment according to the present invention, illustrating some components detached therefrom.

FIG. 11 shows a control circuit 200 arranged on the control circuit board 42 according to the present invention comprises a signal processing unit 71; at least one track sensing unit 72, which detects at least one track signal in a pedaling operation of the bicycle pedal 100; a track sensing circuit 73, which is connected to the at least one track sensing unit 72 to receive the at least one track signal and to transmit the at least one track signal to the signal processing unit 71; at least one strain gauge 41, which detects a plurality of force application signals of the bicycle pedal 100 during the pedaling operation; a pressing force sensing circuit 74, which is connected to the at least one strain gauge 41 to receive the plurality of force application signals and to transmit the plurality of force application signals to the signal processing unit 71; and a wireless transmission module 75, which is connected to the signal processing unit 71.

In the control circuit, based on the at least one track signal and the plurality of force application signals, the signal processing unit 71 acquires a pedaling signal of spatial angle change during the pedaling operation of the bicycle pedal 100 and a force value applied to the pedal body 2, which are then transmitted through the wireless transmission module 75 to a receiver device 8. The pedaling signal and the force value so applied are then displayed on a display 81 of the receiver device 8 for reference by the rider in doing exercise.

Referring to FIGS. 12-15, a structural arrangement of a third embodiment according to the present invention is shown. The constituent components of the instant embodiment are designed with the same reference signs as those of the similar components of the previous embodiment for purposes of correspondence.

In the instant embodiment, the bicycle pedal 100*a* comprises a rotation spindle 1 and a pedal body 2. The pedal body 2 is rotatably mounted, by means of a pair of bearings 31, 32, to the rotation spindle 1. A signal detection device 4 comprises at least one strain gauge 41 (four such strain gauges being shown in the drawings as an illustrative example for the embodiment) and a control circuit board 42, which is disposed in a strain gauge disposition section S1 of the rotation spindle 1.

A spring-biased electric brush device 5*b* is arranged in a receiving space defined between a free end 12 of the rotation spindle 1 and an end cap 20 of the pedal body 2.

Figure 15:
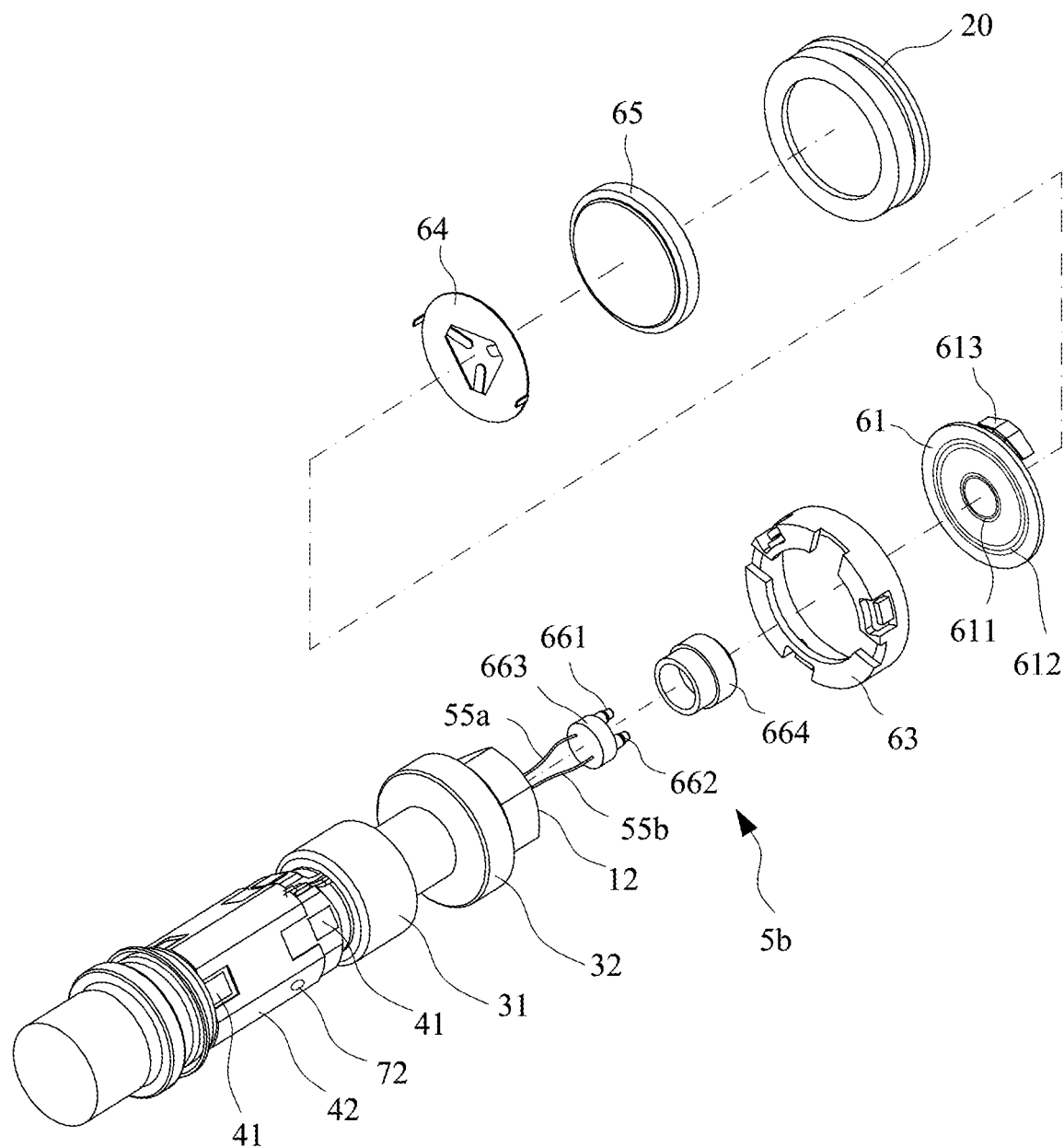
FIG. 15 is another exploded view of the second embodiment according to the present invention, illustrating some components detached therefrom.
Figure 16:
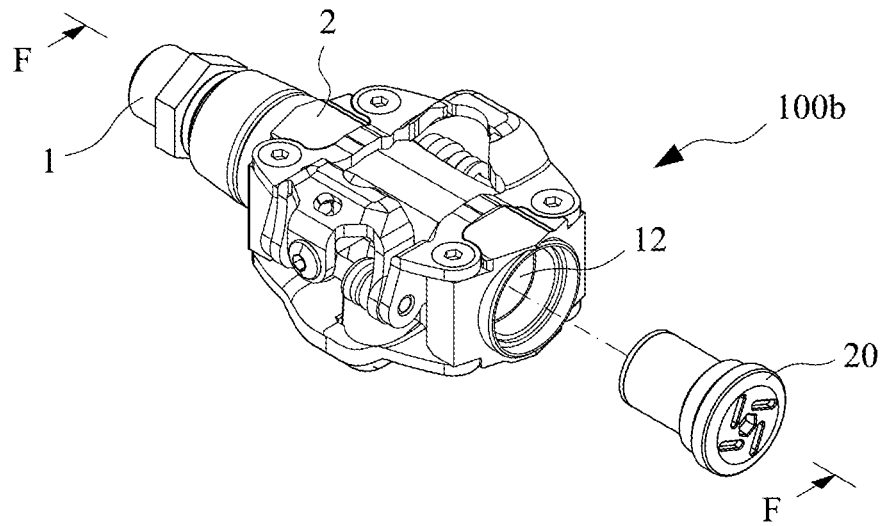
FIG. 16 is a perspective view showing a third embodiment according to the present invention.
Figure 17:
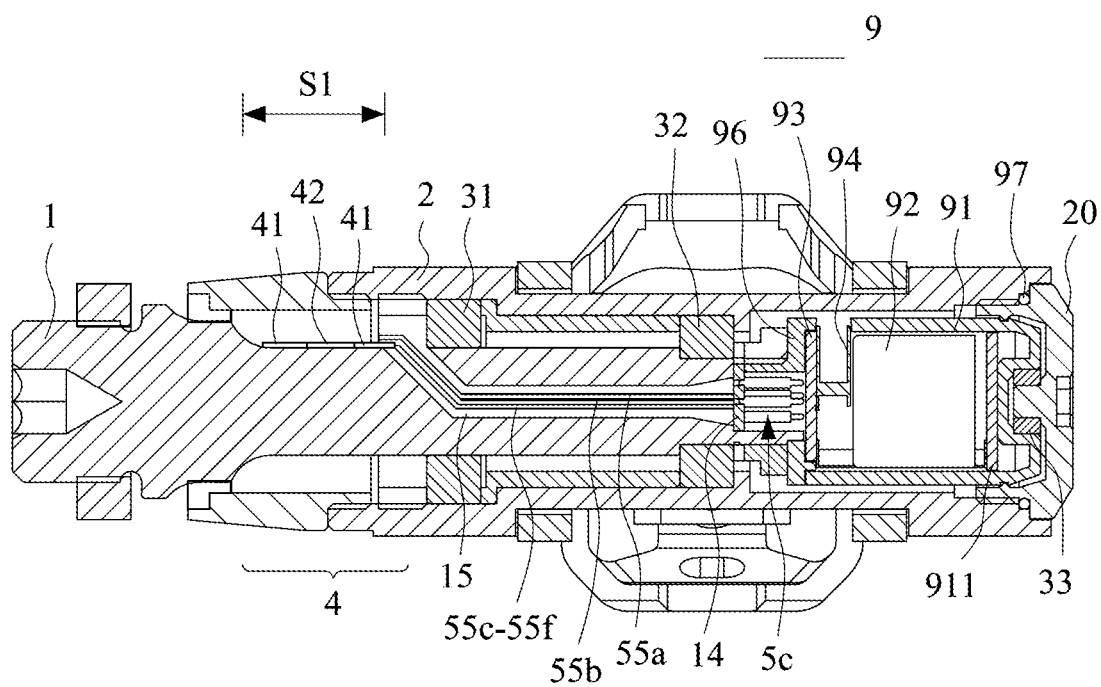
FIG. 17 is a cross-sectional view taken along line F-F of FIG. 16.

The spring-biased electric brush device 5*b* comprises a slip ring carrying board 61. A surface of the slip ring carrying board 61 that faces the free end 12 of the rotation spindle 1 is provided with an anode slip ring 611 and a cathode slip ring 612 (as shown in FIG. 15) that are of ring-like shapes and spaced from each other. The spring-biased electric brush device 5*b* comprises a spring-biased anode brush 661 and a spring-biased cathode brush 662, the two being positioned on a surface of a brush carrying board 663 that faces in a direction toward the slip ring carrying board 61 and spaced from each other, and being electrically connected, by means of a pair of conductive wires 55*a*, 55*b* extending through the central axial hole 13 of the rotation spindle 1, to the control circuit board 42 located in a strain gauge disposition section S1 defined by the rotation spindle 1.

The brush carrying board 663 is supported in a tubular support seat 664, in such a way that front ends of the spring-biased anode brush 661 and the spring-biased cathode brush 662 project outside a surface of tubular support seat 664 by a length. As such, the spring-biased anode brush 661 and the spring-biased cathode brush 662 are respectively biased and pushed by internally arranged springs (the structure of the electric brush being similar to what shown in FIG. 10) to have the spring-biased anode brush 661 and the spring-biased cathode brush 662 contacting with the anode slip ring 611 and the cathode slip ring 612 of the slip ring carrying board 61, respectively.

With the slip ring carrying board 61 being mounted to and positioned on the support seat 63, a conductive board 64 and a battery unit 65 are mounted to an outside surface of the slip ring carrying board 61, such that the positive electrode of the battery unit 65 is electrically connected to the control circuit board 42 through the conductive board 64, the anode slip ring 611 of the slip ring carrying board 61, the anode brush 621 of the brush carrying board 62, the anode conductive wire 55*a*. Besides, the negative electrode of the battery unit 65 is electrically connected to the control circuit board 42 through the conductive tab 613, the cathode slip ring 612 of the slip ring carrying board 61, the cathode brush 622 of the brush carrying board 62, the cathode conductive wire 55*b*.

Regardless whether the pedal body 2 is rotating relative to the rotation spindle 1 or is kept stationary relative to the rotation spindle 1, electrical power from the battery unit 65 is kept in electrical connection, through the spring-biased electric brush device 5*b* and a pair of conductive wires 55*a*, 55*b*, with the control circuit board 42.

The control circuit 200 shown in FIG. 11 is equally applicable to the structural arrangement of the second embodiment according to the present invention to detect a pedaling signal of spatial angle change during the pedaling operation of the bicycle pedal and a force value applied to the pedal body, which are then transmitted to a receiver device to allow the pedaling signal and the force value so applied to be displayed by the receiver device for reference by a rider in doing exercise.

Referring to FIGS. 16-19, a structural arrangement of a third embodiment according to the present invention is shown. The constituent components of the instant embodiment are designed with the same reference signs as those of the similar components of the previous embodiments for purposes of correspondence. In the instant embodiment, the bicycle pedal 100*b* similarly comprises the same constituent components as the previous embodiments as described above.

The instant embodiment is different from the previous embodiments in that the present invention adopts a structure of contact pin assembly 5*c* and a removable battery assembly 9 between the free end 12 of the rotation spindle 1 and the end cap 20 of the pedal body 2.

The contact pin assembly 5*c* comprises an anode contact pin 56*a*, a cathode contact pin 56*b* and at least one signal contact pin spaced from each other and mounted on a vertical supporting plate 14 located at the free end 12 of the rotation spindle 1, extended toward the end cap 20 in an axial direction. In a preferred embodiment of the present invention, a plurality of signal contact pins 56*c*-56*f* are spaced from each other and mounted on the vertical supporting plate 14 for transferring a plurality of electronic signals.

A communication hole 15 is formed in the rotation spindle 1 and communicated between the free end 12 of the rotation spindle 1 and the strain gauge disposition section S1. The anode contact pin 56*a* and the cathode contact pin 56*b* are respectively connected, by means of conductive wires 55*a*, 55*b* extending through the communication hole 15 of the rotation spindle 1, to the control circuit board 42 located in a strain gauge disposition section S1 defined by the rotation spindle 1. The signal contact pins 56*c*-56*f* are respectively connected, by means of signal transmission wires 55*c*-55*f* extending through the communication hole 15 of the rotation spindle 1, to the control circuit board 42.

The removable battery assembly 9 is removably located between the contact pin assembly 5*c* and the end cap 20. The removable battery assembly 9 includes a battery container 91 for accommodating a rechargeable battery unit 92 therein. A contact point circuit board 93 is secured to a side end of the battery container 91 by means of a securing member 96. Further, an electricity charging port 94 is mounted on the contact point circuit board 93, so that an electrical power may be charged through the electricity charging port 94 to the rechargeable battery unit 92.

Optionally, a first end circuit board 911 may be arranged in the battery container 91, so that relative electronic components such as wireless transmission module, antenna and/or indicator may be mounted on the first end circuit board 911. Furthermore, an end bearing 33 is located between the battery container 91 and the end cap 20, so that the first pedal body 2 and the end cap 20 is rotatable about the rotation spindle 1 and the removable battery assembly 9 by mean of the bearings 31, 32 and 33 during pedaling.

Figure 18:
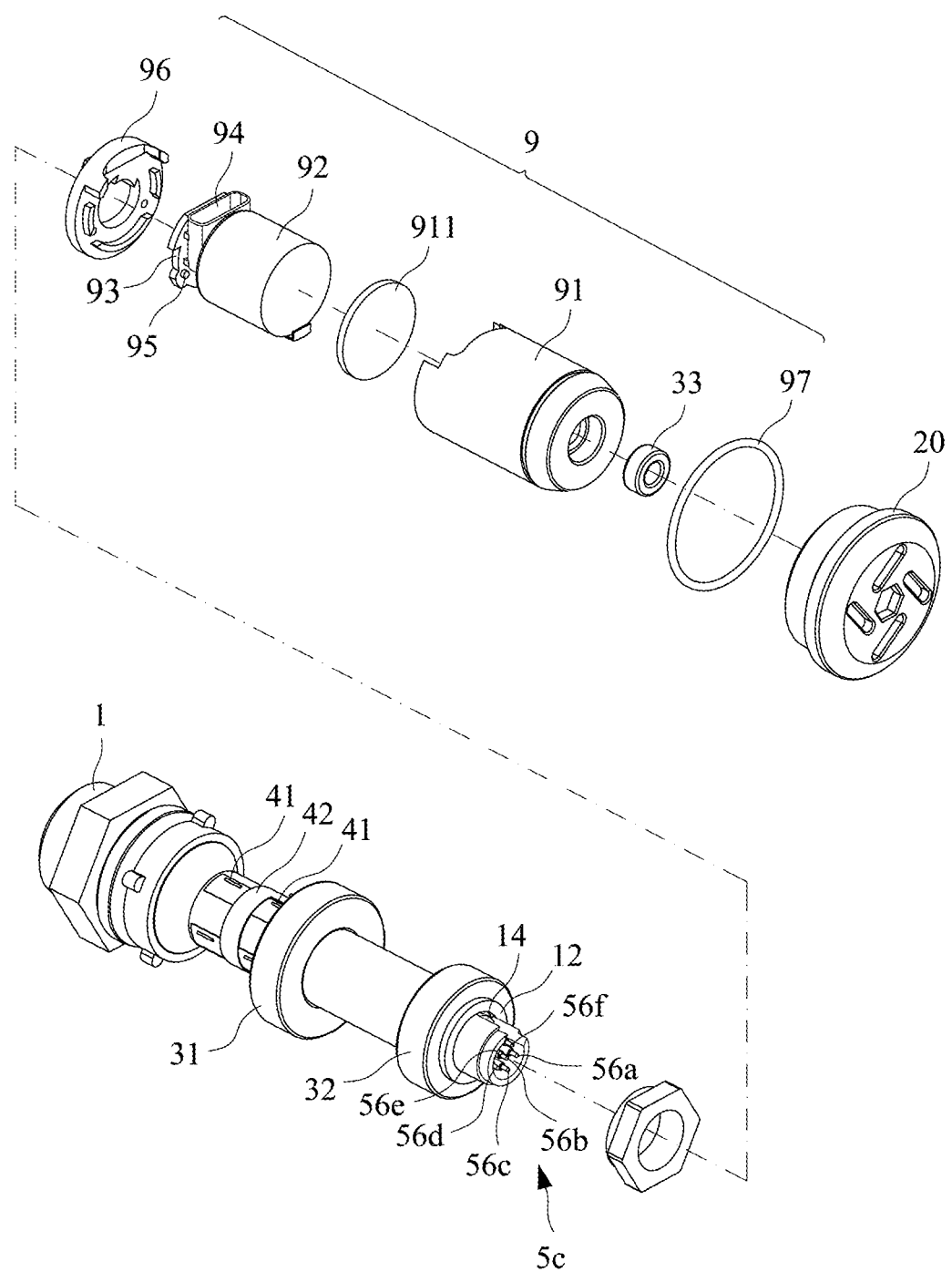
FIG. 18 is an exploded view of the third embodiment according to the present invention, illustrating some components detached therefrom.
Figure 19:
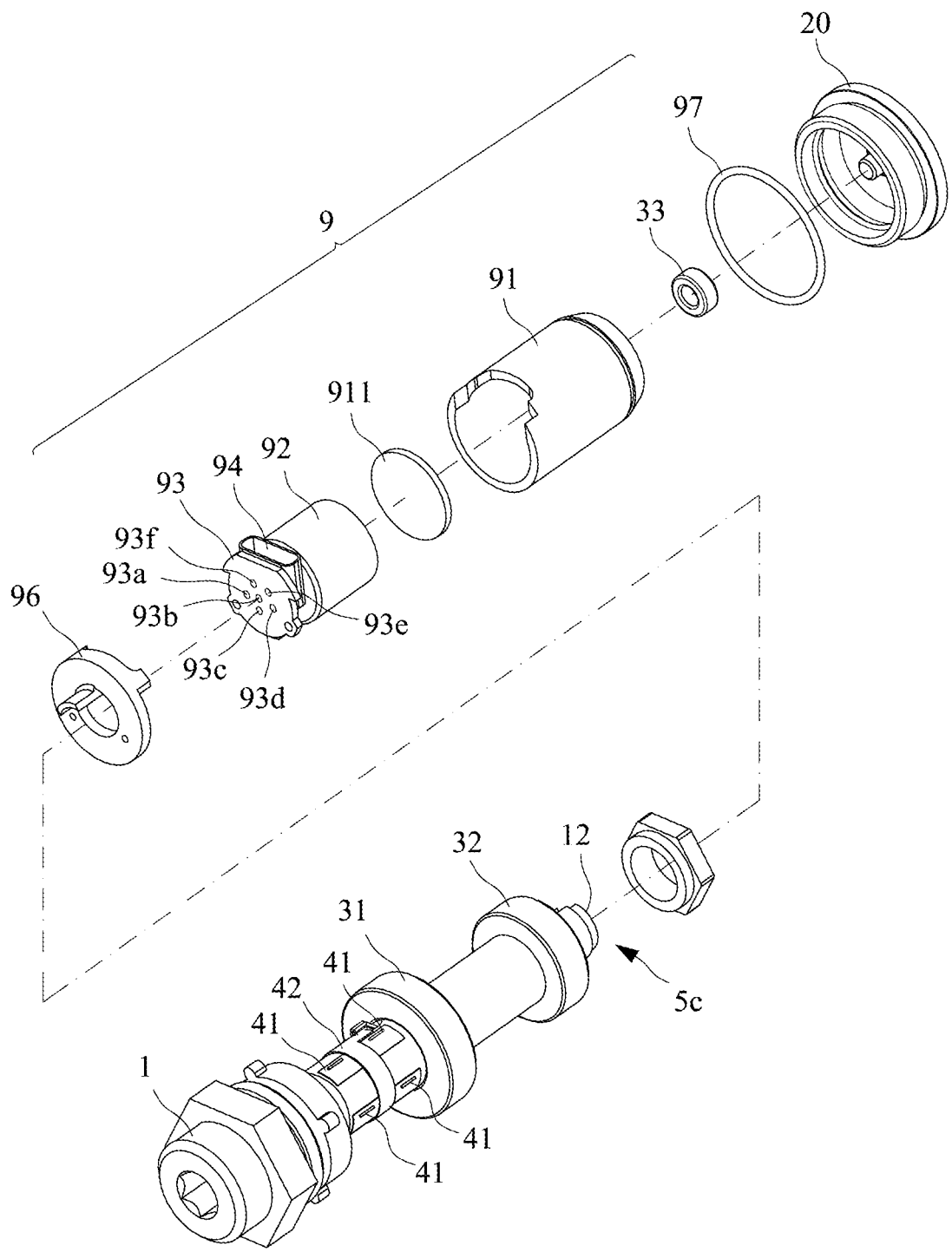
FIG. 19 is another exploded view of the third embodiment according to the present invention, illustrating some components detached therefrom.
Figure 20:
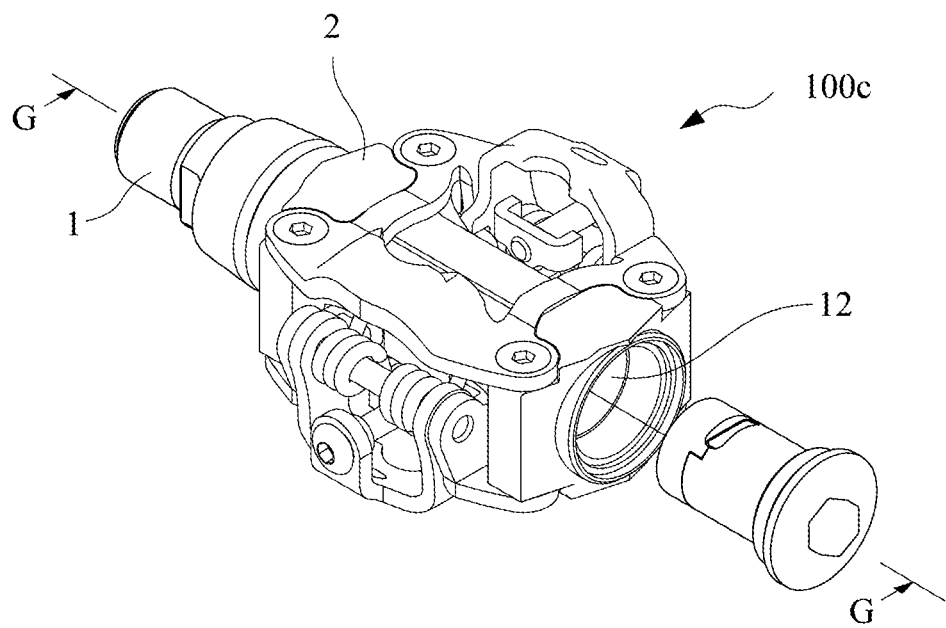
FIG. 20 is a perspective view showing a fourth embodiment according to the present invention.
Figure 21:
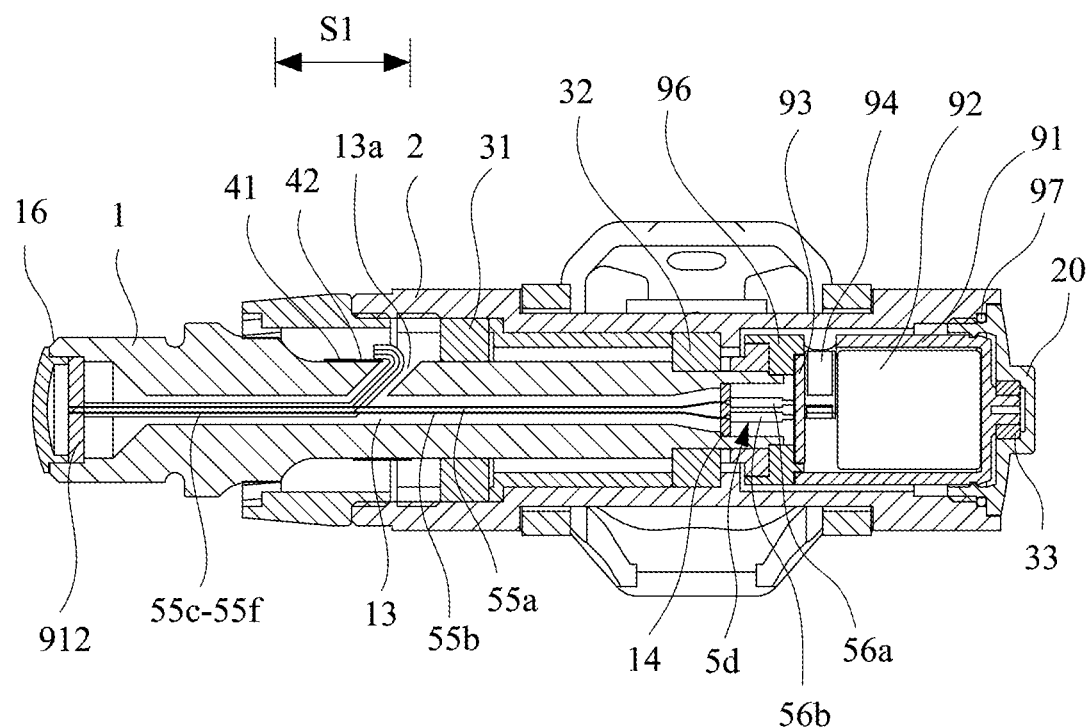
FIG. 21 is a cross-sectional view taken along line G-G of FIG. 20.
Figure 22:
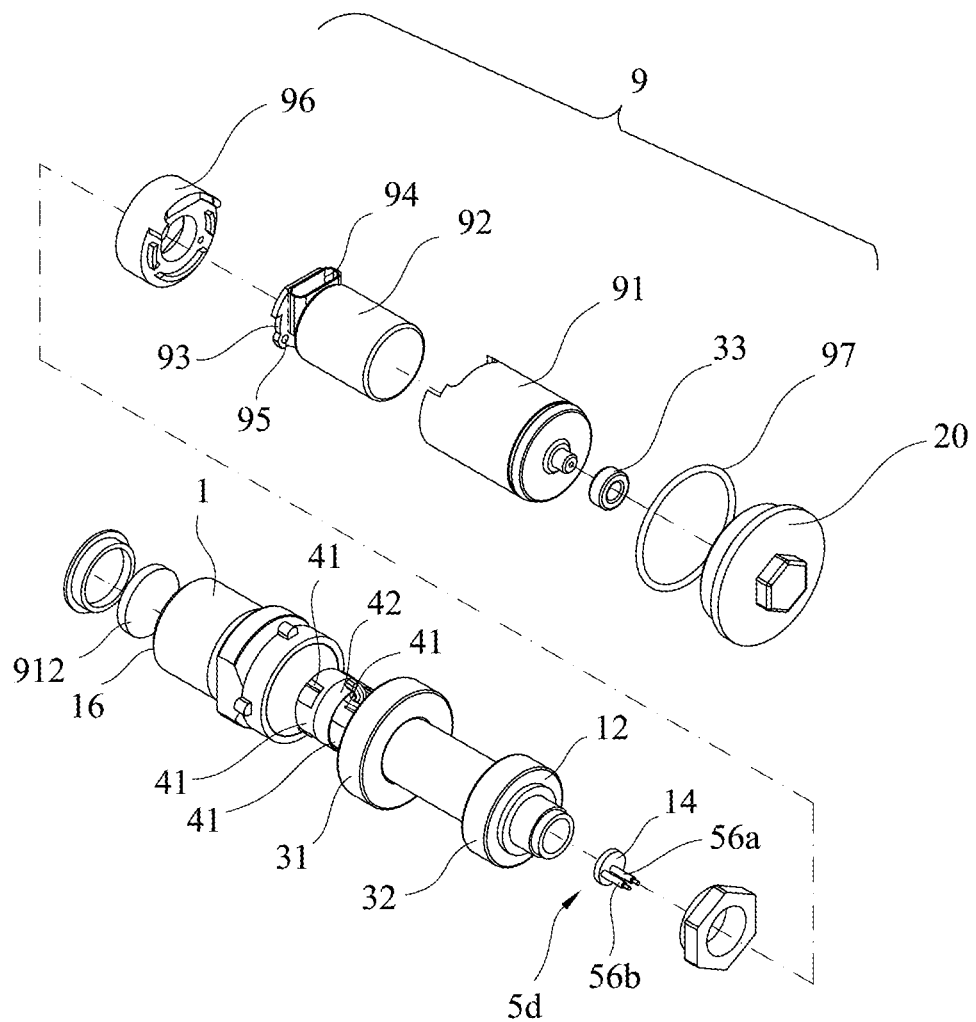
FIG. 22 is an exploded view of the fourth embodiment according to the present invention, illustrating some components detached therefrom.
Figure 23:
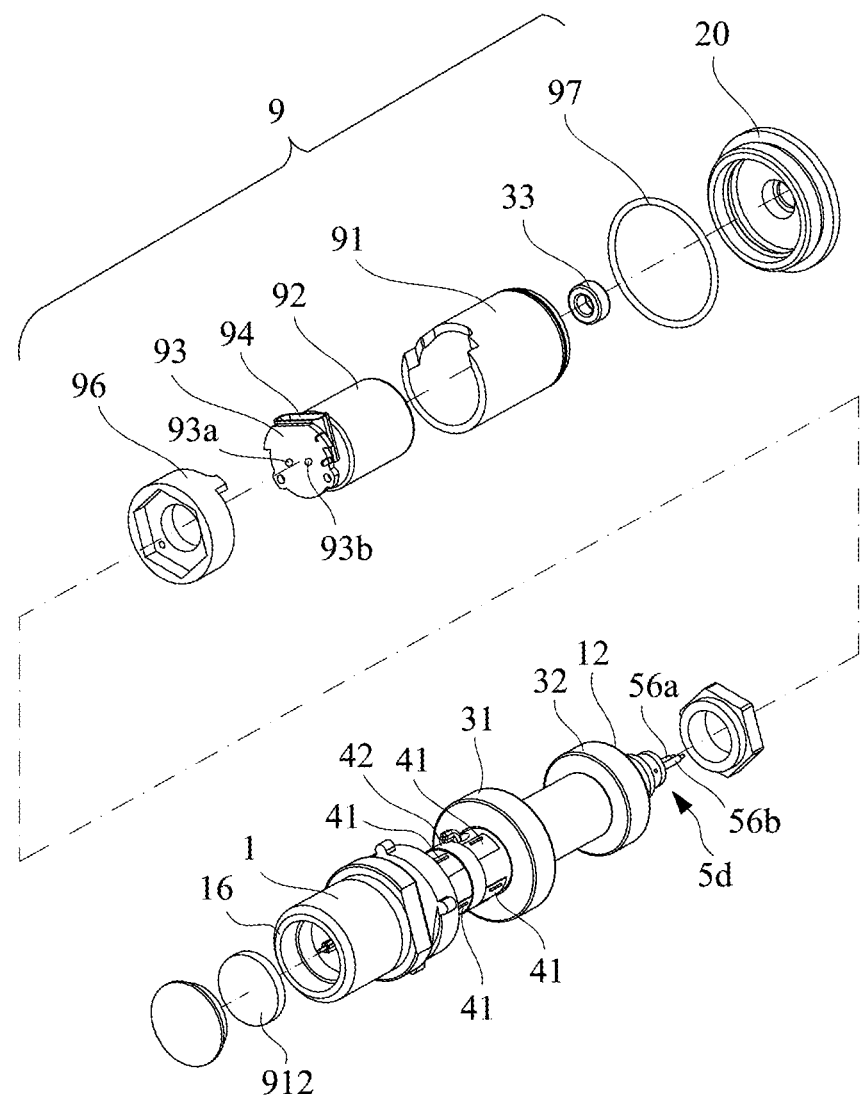
FIG. 23 is another exploded view of the fourth embodiment according to the present invention, illustrating some components detached therefrom.

As shown in FIGS. 18 and 19, the contact point circuit board 93 that faces the free end 12 of the rotation spindle 1 is provided with an anode contact point 93*a* electrically connected to an anode terminal of the battery unit 92, a cathode contact point 93*b* electrically connected to a cathode terminal of the battery unit 92 and a plurality of signal contact points 93c-93f connected to at least one electronic component 95 mounted on the contact point circuit board 93.

Alternatively, the anode contact point 93a, the cathode contact point 93b and the signal contact points 93c-93f may be made in the form of conductive sockets or conductive through holes for electrically connected to the anode contact pin 56a, the cathode contact pin 56b and the signal contact pins 56c-56f respectively.

When the removable battery assembly 9 is coupled to the free end 12 of the rotation spindle 1, the anode contact point 93a, the cathode contact point 93b and the signal contact points 93c-93f of the removable battery assembly 9 are correspondingly contacted to the anode contact pin 56a, the cathode contact pin 56b and the signal contact pins 56c-56f of the contact pin assembly 5c, so that the electrical power of the rechargeable battery unit 92 and electronic signals of the electronic component 95 are electrically connected to the control circuit board 42 through the removable battery assembly 9, the contact pin assembly 5c and the conductive wires 55a, 55b and signal transmission wires 55c-55f respectively.

The battery container 91, the rechargeable battery unit 92, the contact point circuit board 93, the electricity charging port 94, the first end circuit board 911 and the securing member 96 are assembled as a union unit to form the removable battery assembly 9 adapted to be simply electrically connected to the contact pin assembly 5c and then covered by the end cap 20. The removable battery assembly 9 is also adapted to be removed from the free end 12 of the rotation spindle 1 after the end cap 20 is removed for charging. Preferably, a sealing element 97 is located between the battery container 91 and the end cap 20 for water-proof purpose.

Referring to FIGS. 20-23, a structural arrangement of a fourth embodiment according to the present invention is shown. In the instant embodiment, the bicycle pedal 100c similarly comprises the same constituent components as the third embodiments as described above.

The instant embodiment adopts a structure of contact pin assembly 5d similar to the contact pin assembly 5c as the third embodiment. The contact pin assembly 5d comprises an anode contact pin 56a and a cathode contact pin 56b spaced from each other and mounted on a vertical supporting plate 14 located at the free end 12 of the rotation spindle 1, extended toward the end cap 20 in an axial direction.

A central axial hole 13 is formed in the rotation spindle 1 and communicated between a free end 12 and a crank end 16 of the rotation spindle 1. Further, a second end circuit board 912 is arranged in a space defined at the crank end 16 of the rotation spindle 1. The anode contact pin 56a and the cathode contact pin 56b are respectively connected, by means of the anode conductive wire 55a and the cathode conductive wire 55b extending through the central axial hole 13 of the rotation spindle 1, to the second end circuit board 912.

Further, a branch pathway 13a is formed in the rotation spindle 1 and intercommunicating between the central axial hole 13 and the strain gauge disposition section S1, so that a plurality of signal transmission wires 55c-55f may pass through the central axial hole 13 and the branch pathway 13a for connecting the second end circuit board 912 to the control circuit board 42.

The removable battery assembly 9 is removably located between the contact pin assembly 5d and the end cap 20. The removable battery assembly 9 includes a battery container 91 for accommodating a rechargeable battery unit 92 therein. A contact point circuit board 93 is secured to a side end of the battery container 91 by means of a securing member 96. Further, an electricity charging port 94 is mounted on the contact point circuit board 93, so that an electrical power may be charged through the electricity charging port 94 to the rechargeable battery unit 92.

Furthermore, an end bearing 33 is located between the battery container 91 and the end cap 20, so that the first pedal body 2 and the end cap 20 is rotatable about the rotation spindle 1 and the removable battery assembly 9 by mean of the bearings 31, 32 and 33 during pedaling.

The detailed description provided above is made with reference to feasible embodiments of the present invention. Such embodiments are not intended to limit the scope of the present invention as defined in the appended claims. Equivalent embodiments or variations are considered falling within the scope of the claims.

What is claimed is:

1. A bicycle pedal signal detection device, operable for a pedaling signal generated by a bicycle pedal during a pedaling operation, the bicycle pedal being provided with a rotation spindle and a pedal body, the pedal body being rotatably mounted, by means of a pair of bearings, to the rotation spindle, the pedal body being combined with an end cap, the bicycle pedal signal detection device comprising:
    at least one strain gauge disposed in a strain gauge disposition section defined on the rotation spindle;
    a control circuit board arranged in the strain gauge disposition section of the rotation spindle and being electrically connected to the at least one strain gauge;
    a rechargeable battery unit for supplying electrical power;
    a contact pin assembly mounted on a vertical supporting plate located at a free end of the rotation spindle, including an anode contact pin and a cathode contact pin extended toward the end cap in an axial direction and connected to the control circuit board by an anode conductive wire and a cathode conductive wire, respectively; and
    a removable battery assembly including:
    a battery container positioned between the free end of the rotation spindle and the end cap for accommodating the rechargeable battery unit therein;
    a contact point circuit board located between the contact pin assembly and the free end of the rotation spindle, mounted to the battery container, of which a surface that faces the free end of the rotation spindle is provided with an anode contact point and a cathode contact point electrically connected to the rechargeable battery unit; and
    an electricity charging port mounted on the contact point circuit board, so that an electrical power is charged through the electricity charging port to the rechargeable battery unit; and
    wherein the anode contact point and the cathode contact point of the removable battery assembly are correspondingly contacted to the anode contact pin and the cathode contact pin of the contact pin assembly, so that the electrical power of the rechargeable battery unit is supplied to the control circuit board through the anode conductive wire and the cathode conductive wire.

2. The bicycle pedal signal detection device according to claim 1, wherein the removable battery assembly further comprises a securing member for securing the contact point circuit board onto the battery container.

3. The bicycle pedal signal detection device according to claim 1, further comprising an end bearing located between the battery container and the end cap.

4. The bicycle pedal signal detection device according to claim 1, further comprising a first end circuit board arranged in the battery container and electrically connected to the rechargeable battery unit and the contact point circuit board.

5. The bicycle pedal signal detection device according to claim 1, wherein the rotation spindle is formed with a communication hole communicated between the free end of the rotation spindle and the strain gauge disposition section.

6. The bicycle pedal signal detection device according to claim 5, wherein the anode conductive wire and the cathode conductive wire pass through the communication hole for connecting the anode contact pin and the cathode contact pin to the control circuit board.

7. The bicycle pedal signal detection device according to claim 1, further comprising:
- a central axial hole extending in an axial direction of the rotation spindle and communicated between the free end and an opposing crank end of the rotation spindle; and
- a branch pathway formed in the rotation spindle and intercommunicating between the central axial hole and the strain gauge disposition section.

8. The bicycle pedal signal detection device according to claim 7, further comprising:
- a second end circuit board located at the crank end of the rotation spindle; and
- at least one signal transmission wire passing through the central axial hole and the branch pathway for connecting the second end circuit board to the control circuit board.

* * * * *